US010521755B2

(12) United States Patent
Yeager et al.

(10) Patent No.: US 10,521,755 B2
(45) Date of Patent: Dec. 31, 2019

(54) SYSTEM AND METHOD FOR PROCESSING ITEMS FOR INTERNATIONAL DISTRIBUTION

(71) Applicant: United States Postal Service, Washington, DC (US)

(72) Inventors: Teresa Y. Yeager, Washington, DC (US); Arneece L. Williams, Washington, DC (US); Neena Dhuria, Washington, DC (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 15/145,645

(22) Filed: May 3, 2016

(65) Prior Publication Data

US 2016/0328676 A1 Nov. 10, 2016

Related U.S. Application Data

(60) Provisional application No. 62/156,781, filed on May 4, 2015.

(51) Int. Cl.
*G06Q 10/08* (2012.01)
*G06Q 50/28* (2012.01)
*G06Q 50/32* (2012.01)

(52) U.S. Cl.
CPC ... *G06Q 10/0831* (2013.01); *G06Q 10/08345* (2013.01); *G06Q 50/28* (2013.01); *G06Q 50/32* (2013.01)

(58) Field of Classification Search
CPC ......... G06Q 50/28–32; G06Q 2250/00; G06Q 10/083
See application file for complete search history.

(56) References Cited

U.S. PATENT DOCUMENTS

| 5,968,110 | A | 10/1999 | Westrope et al. |
| 6,233,565 | B1 | 5/2001 | Lewis et al. |
| 6,463,421 | B2 | 10/2002 | Junger |
| 7,058,581 | B1 | 6/2006 | Young |
| D535,690 | S | 1/2007 | Fabel et al. |
| D561,825 | S | 2/2008 | Davidson et al. |
| 7,455,226 | B1 | 11/2008 | Hammond et al. |

(Continued)

FOREIGN PATENT DOCUMENTS

| CN | 101496057 A | 7/2009 |
| CN | 101553836 A | 10/2009 |

(Continued)

OTHER PUBLICATIONS

Industrial Offline E-Postage Systems. In: Electronic Postage Systems. Advances in Information Security, vol. 26. Springer, Boston, MA (2007).*

(Continued)

*Primary Examiner* — Daniel Vetter
*Assistant Examiner* — Scott M Tungate
(74) *Attorney, Agent, or Firm* — Knobbe Martens Olson & Bear LLP

(57) ABSTRACT

A system and method for generating shipping labels for shipping items to other countries. The shipping label can be based on shipping information for the item. The shipping label can also contain information about whether there was a landed cost guarantee associated with the item.

24 Claims, 6 Drawing Sheets

(56) References Cited

U.S. PATENT DOCUMENTS

| | | | |
|---|---|---|---|
| D594,061 S | 6/2009 | Kudimi | |
| 7,577,598 B2 | 8/2009 | Rousseau et al. | |
| RE40,924 E | 9/2009 | Nicholls et al. | |
| 7,596,500 B1 | 9/2009 | Thompson et al. | |
| D602,166 S | 10/2009 | Coyne, III et al. | |
| 7,725,406 B2 | 5/2010 | Black et al. | |
| 7,853,480 B2 | 12/2010 | Taylor et al. | |
| 7,937,331 B2 | 5/2011 | Mack | |
| D641,040 S | 7/2011 | Tetrault | |
| 8,041,607 B1 | 10/2011 | Coursol | |
| 8,046,273 B2 | 10/2011 | Welter et al. | |
| D650,009 S | 12/2011 | Tetrault | |
| 8,078,485 B1 | 12/2011 | Kraehmueller et al. | |
| 8,156,007 B1 | 4/2012 | Anthony et al. | |
| D660,355 S | 5/2012 | Tetrault | |
| D654,195 S | 7/2012 | Rosenthal et al. | |
| D662,976 S | 7/2012 | Tetrault | |
| 8,279,064 B2 | 10/2012 | Sansone et al. | |
| 8,360,313 B1 | 1/2013 | Leon et al. | |
| 8,407,110 B1 | 3/2013 | Joseph et al. | |
| 8,505,978 B1 | 8/2013 | Leon | |
| 8,584,107 B2 | 11/2013 | Skaistis | |
| 8,701,977 B2 | 4/2014 | Spaulding | |
| 9,033,230 B2 | 5/2015 | Combs et al. | |
| 9,984,351 B1 | 5/2018 | Antony et al. | |
| 2002/0010689 A1 | 1/2002 | Tibbs et al. | |
| 2002/0013739 A1 | 1/2002 | O'Donnell et al. | |
| 2002/0019785 A1 | 2/2002 | Whitman | |
| 2002/0029155 A1 | 3/2002 | Hetzel et al. | |
| 2002/0032573 A1 | 3/2002 | Williams et al. | |
| 2002/0032612 A1 | 3/2002 | Williams et al. | |
| 2002/0032668 A1 | 3/2002 | Kohler et al. | |
| 2002/0120527 A1 | 8/2002 | Lam et al. | |
| 2002/0152093 A1 | 10/2002 | Chalmers et al. | |
| 2002/0152174 A1 | 10/2002 | Woods et al. | |
| 2002/0178074 A1 | 11/2002 | Bloom | |
| 2003/0105704 A1 | 6/2003 | Sundel | |
| 2003/0135432 A1 | 7/2003 | McIntyre et al. | |
| 2003/0144971 A1 | 7/2003 | Das et al. | |
| 2003/0195784 A1 | 10/2003 | William, Jr. | |
| 2003/0195843 A1 | 10/2003 | Matsuda et al. | |
| 2003/0217017 A1 | 11/2003 | Willoughby et al. | |
| 2003/0220855 A1 | 11/2003 | Lam et al. | |
| 2003/0225625 A1 | 12/2003 | Chew et al. | |
| 2004/0049446 A1 | 3/2004 | Seljeseth | |
| 2004/0083233 A1 | 4/2004 | Willoughby | |
| 2004/0093312 A1 | 5/2004 | Cordery et al. | |
| 2004/0122690 A1 | 6/2004 | Willoughby | |
| 2004/0148052 A1 | 7/2004 | Ferguson et al. | |
| 2004/0172260 A1 | 9/2004 | Junger et al. | |
| 2004/0186811 A1* | 9/2004 | Gullo | G06Q 30/04 705/402 |
| 2004/0193438 A1 | 9/2004 | Edward, Jr. et al. | |
| 2004/0194056 A1 | 9/2004 | Combs et al. | |
| 2004/0212833 A1 | 10/2004 | Taskett et al. | |
| 2004/0215480 A1 | 10/2004 | Kadaba | |
| 2004/0215531 A1 | 10/2004 | Stashluk, Jr. et al. | |
| 2004/0243690 A1 | 12/2004 | Hancock et al. | |
| 2004/0267642 A1 | 12/2004 | Stenz et al. | |
| 2005/0060165 A1 | 3/2005 | Knight et al. | |
| 2005/0060259 A1 | 3/2005 | Holmes et al. | |
| 2005/0061878 A1 | 3/2005 | Barenburg et al. | |
| 2005/0086132 A1 | 4/2005 | Kanitz et al. | |
| 2005/0114221 A1 | 5/2005 | Walters et al. | |
| 2005/0119786 A1 | 6/2005 | Kadaba | |
| 2005/0144059 A1 | 6/2005 | Schuessler | |
| 2005/0149453 A1 | 7/2005 | Amling et al. | |
| 2005/0192816 A1 | 9/2005 | Wechsel | |
| 2005/0222853 A1 | 10/2005 | Black et al. | |
| 2005/0222911 A1 | 10/2005 | Kerker et al. | |
| 2005/0228681 A1 | 10/2005 | McMahon | |
| 2005/0248806 A1 | 11/2005 | Klein et al. | |
| 2005/0264832 A1 | 12/2005 | Baum et al. | |
| 2005/0283406 A1 | 12/2005 | Kuelbs et al. | |
| 2006/0036504 A1 | 2/2006 | Allocca et al. | |
| 2006/0149577 A1 | 7/2006 | Stashluk, Jr. et al. | |
| 2006/0237547 A1 | 10/2006 | Barenburg et al. | |
| 2007/0043579 A1 | 2/2007 | Kent et al. | |
| 2007/0055639 A1 | 3/2007 | Garvey et al. | |
| 2007/0095904 A1 | 5/2007 | Barta et al. | |
| 2007/0156281 A1 | 7/2007 | Leung et al. | |
| 2007/0192215 A1 | 8/2007 | Taylor et al. | |
| 2007/0299791 A1 | 12/2007 | Mack | |
| 2008/0071627 A1 | 3/2008 | Junger | |
| 2008/0071633 A1 | 3/2008 | Ozkan et al. | |
| 2008/0097933 A1 | 4/2008 | Awaida et al. | |
| 2008/0120129 A1 | 5/2008 | Seubert et al. | |
| 2008/0126157 A1 | 5/2008 | Rousso et al. | |
| 2008/0162305 A1 | 7/2008 | Rousso et al. | |
| 2008/0255863 A1 | 10/2008 | Mack et al. | |
| 2008/0288274 A1 | 11/2008 | Roccagiovine et al. | |
| 2008/0294536 A1 | 11/2008 | Taylor et al. | |
| 2008/0302866 A1 | 12/2008 | Baugh et al. | |
| 2009/0037203 A1 | 2/2009 | Gallagher et al. | |
| 2009/0094082 A1 | 4/2009 | Willoughby | |
| 2009/0138379 A1 | 5/2009 | Scheman | |
| 2009/0144070 A1 | 6/2009 | Psota et al. | |
| 2009/0171802 A1 | 7/2009 | Raygoza | |
| 2009/0172035 A1 | 7/2009 | Lessing et al. | |
| 2009/0322510 A1 | 12/2009 | Berger et al. | |
| 2010/0057596 A1 | 3/2010 | Sundel | |
| 2010/0057678 A1 | 3/2010 | Fein et al. | |
| 2010/0067041 A1 | 3/2010 | Endruscheit et al. | |
| 2010/0100233 A1 | 4/2010 | Lu | |
| 2010/0145754 A1 | 6/2010 | Rahman | |
| 2010/0299278 A1 | 11/2010 | Kriss et al. | |
| 2010/0300944 A1 | 12/2010 | Carpenter et al. | |
| 2010/0332284 A1 | 12/2010 | Hilbush et al. | |
| 2011/0016043 A1* | 1/2011 | Dornseif | G06Q 20/10 705/39 |
| 2011/0029429 A1 | 2/2011 | Whitehouse | |
| 2011/0050397 A1 | 3/2011 | Cova | |
| 2011/0050423 A1 | 3/2011 | Cova et al. | |
| 2011/0066549 A1* | 3/2011 | Whitehouse | G06Q 10/0831 705/39 |
| 2011/0106714 A1 | 5/2011 | Junger | |
| 2011/0173129 A1 | 7/2011 | Mack | |
| 2011/0213700 A1 | 9/2011 | Sant'Anselmo | |
| 2011/0242554 A1 | 10/2011 | Farry et al. | |
| 2012/0030070 A1 | 2/2012 | Keller et al. | |
| 2013/0006821 A1 | 1/2013 | Pirrello et al. | |
| 2013/0090998 A1 | 4/2013 | Shimogori | |
| 2013/0218723 A1 | 8/2013 | Masud et al. | |
| 2013/0304663 A1 | 11/2013 | Whitehouse | |
| 2014/0058971 A1 | 2/2014 | Muppirala et al. | |
| 2014/0172735 A1* | 6/2014 | Jena | G06Q 10/08345 705/330 |
| 2014/0279440 A1* | 9/2014 | Felix | G06Q 10/0831 705/39 |
| 2015/0019454 A1* | 1/2015 | Helseth | G06Q 10/0831 705/331 |
| 2015/0161562 A1 | 6/2015 | Felix et al. | |
| 2018/0053152 A1 | 2/2018 | Chalmers | |

FOREIGN PATENT DOCUMENTS

| | | |
|---|---|---|
| CN | 101755245 A | 6/2010 |
| CN | 101789200 A | 7/2010 |
| CN | 101894332 A | 11/2010 |
| WO | WO 2008/002494 A2 | 1/2008 |
| WO | WO 2012/178047 A1 | 12/2012 |

OTHER PUBLICATIONS

International Search Report and Written Opinion dated Aug. 5, 2016 for International Patent Application No. PCT/US16/30585, which corresponds to subject U.S. Appl. No. 14/207,086.

International Search Report and Written Opinion dated Jan. 6, 2015 for International Patent Application No. PCT/US14/19929.

International Search Report and Written Opinion dated Jul. 14, 2014 for International Patent Application No. PCT/US2014/024192.

(56) References Cited

OTHER PUBLICATIONS

Yao, "Pricing for shipping services of online retailers: Analytical and empirical approaches", published by Elsevier, on Jan. 25, 2012, all pages (Year: 2012).

* cited by examiner

SYSTEM AND METHOD FOR PROCESSING ITEMS FOR INTERNATIONAL DISTRIBUTION

CROSS REFERENCE TO RELATED APPLICATIONS

Any and all applications for which a foreign or domestic priority claim is identified in the Application Data Sheet as filed with the present application are hereby incorporated by reference under 37 CFR 1.57.

BACKGROUND

Field

The development relates to a system and method for international distribution of items, including import and export tariffs and appropriately labeling items that are going to be shipped. More particularly, the system and method determine shipping information for the item to facilitate international distribution, including whether there is a landed cost associated with the item, and then generate the appropriate shipping label for the item.

Description of the Related Technology

Businesses, consumers, and other entities that desire to ship items to other countries desire to accurately calculate duty and applicable taxes, but generally lack the resources to pay for export preparation. Users seek peace-of-mind that products to be exported can ship without violating export and import regulations. Thus, shipping labels that can help guarantee that the correct duty and taxes are paid when an item is shipped overseas are desirable.

SUMMARY

In one aspect, a system for providing a landed cost guarantee comprises an application programing interface (API) module configured to receive, via a processor, communications containing item shipping information for an item; a landed cost module configured to receive the item shipping information from the application programming interface module, and to determine, via a processor, a landed cost guarantee estimate and a landed cost guarantee fee for shipping the item; a printing module in communication with the landed cost module configured to generate a label having a computer readable code thereon; a verification module configured to receive, from a distribution entity via a processor, an actual landed cost paid for the item, and an indication of a payment of a difference between the actual landed cost paid for the item and the landed cost guarantee estimate; and a reimbursement module configured to receive from a user, via the application programming interface, an indication of a payment of the difference between the actual landed cost and the landed cost guarantee estimate, and to generate reimbursement for the difference between the actual landed cost and the landed cost guarantee estimate.

The system may additionally comprise a verification module configured to determine, via a processor, an actual landed cost paid for shipping an item. The system may additionally comprise a reimbursement module configured to reimburse, via a processor, the difference between the actual landed cost and the landed cost guarantee estimate.

Further, the landed cost module of the system may calculate the landed cost guarantee estimate at least in part based on the shipping information. The landed cost module may also calculate the landed cost guarantee fee at least in part based on the historical accuracy of the landed cost guarantee estimate.

The system may additionally comprise a shipping label module configured to generate, via a processor, shipping labels for items. The shipping labels may designate whether the landed cost guarantee was purchased for items.

The system may additionally comprise a communication module configured to send, via a processor, communications on how to submit verification information and receive reimbursements.

The API module of the system may also receive communications confirming the purchase of the landed cost guarantee.

In an embodiment there is a method for providing a landed cost guarantee, the method comprising: receiving, via a computing device, shipping information for shipping an item; calculating, via a computing device, a landed cost guarantee estimate for shipping that item; calculating a landed cost guarantee fee for shipping that item; and communicating, via a computing device, the landed cost guarantee fee and the landed cost guarantee estimate.

The method may additionally comprise verifying, via a computing device, the actual landed cost paid for shipping an item. The method may additionally comprise reimbursing, via a computing device, the difference between the actual landed cost and the landed cost guarantee estimate. The method may additionally comprise calculating the landed cost guarantee estimate is at least in part calculated based on the shipping information. Additionally, the landed cost guarantee fee can be calculated at least in part based on the historical accuracy of the landed cost guarantee estimate.

The method may additionally comprise generating, via a computing device, shipping labels for items. The shipping labels can designate whether the landed cost guarantee was purchased for items.

The method may additionally comprise communicating, via a computing device, how to submit verification information. The method may additionally comprise communicating how to receive reimbursements. The method may additionally comprise receiving communications, via a computing device, confirming the purchase of the landed cost guarantee.

In another embodiment there is an apparatus for providing a landed cost guarantee, the apparatus comprising: means for receiving shipping information for shipping an item; means for calculating a landed cost guarantee estimate for shipping that item; means for calculating a landed cost guarantee fee for shipping that item; and means for communicating the landed cost guarantee fee and the landed cost guarantee estimate.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

DETAILED DESCRIPTION

The features, aspects, and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

Figure 1:
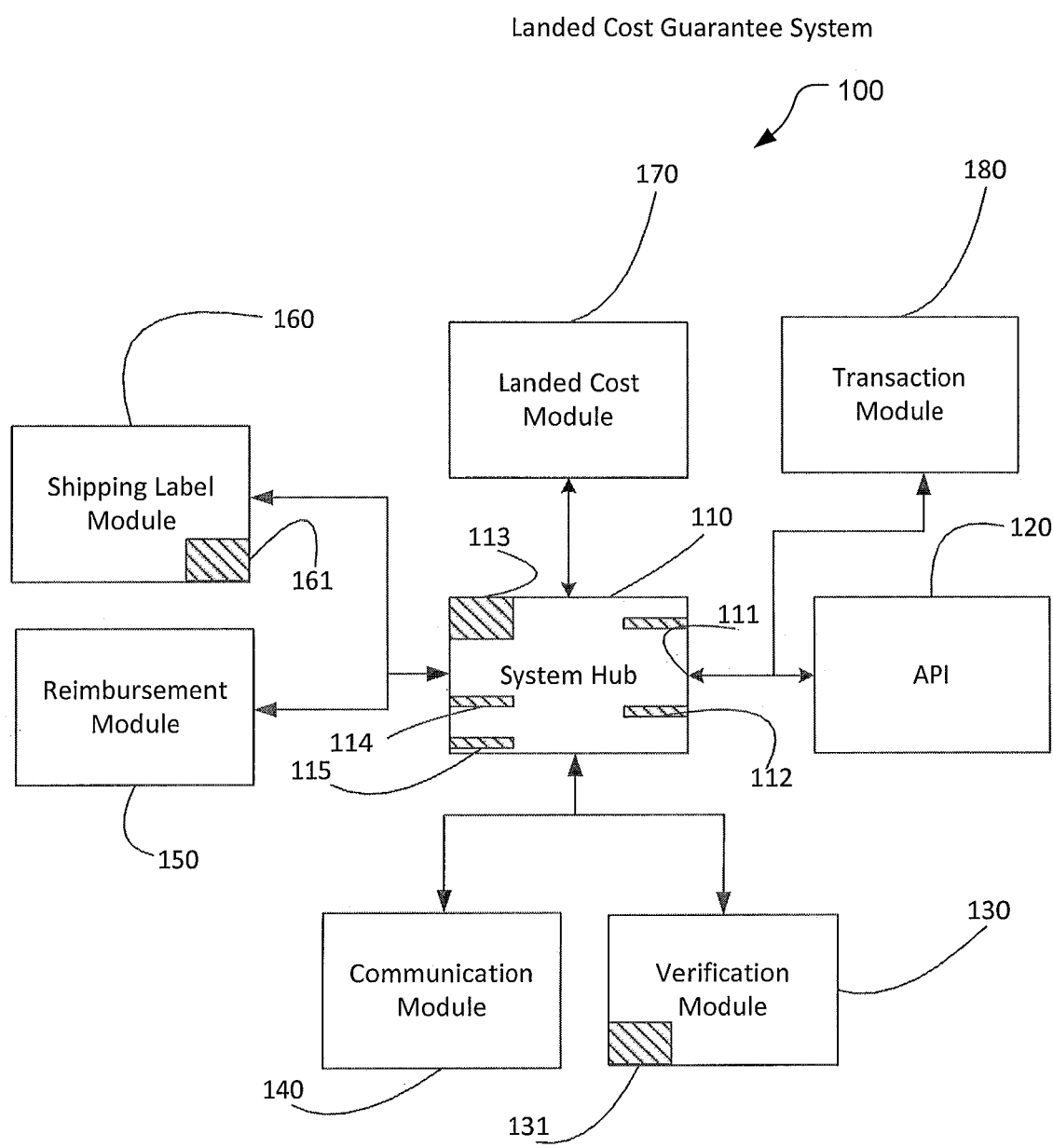
FIG. 1 is a block diagram of an embodiment of the landed cost guarantee system.

The system and method described herein relate to providing a landed cost guarantee to senders or receivers of items. FIG. 1 depicts an embodiment of a system 100 for coordinating the shipment of items with a landed cost guarantee. The system 100 comprises a system hub 110, an API 120, a verification module 130, a communication module 140, a reimbursement module 150, a shipping label module 160, a landed cost module 170, and a transaction module 180. The system hub 110 is in communication, either wired or wirelessly, with at least the API 120, the verification module 130, the communication module 140, the reimbursement module 150, the shipping label module 160, the landed cost module 170, and the transaction module 180.

The system hub 110 may comprise or be a component of a processing system implemented with one or more processors. The system hub 110 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 110 may comprise a processor 111 such as, for example, a microprocessor, such as a Pentium® processor, a Pentium® Pro processor, a 8051 processor, a MIPS® processor, a Power PC® processor, an Alpha® processor, a microcontroller, or the like. The processor 111 typically has conventional address lines, conventional data lines, and one or more conventional control lines. The processor 111 may be in communication with a first memory 112, which may include, for example, RAM memory, flash memory, ROM memory, EPROM memory, EEPROM memory, registers, hard disk, a removable disk, a CD-ROM, or any other form of storage medium known in the art. The first memory 112 may include, for example, software, at least one software module, instructions, steps of an algorithm, or any other information. In some embodiments, the processor 111 performs processes in accordance with instructions stored in the first memory 112. These processes may include, for example, controlling features and/or components of the system 100, and controlling access to and from, and transmitting information and data to and from the system hub 110 and the constituent components of the system 100, as will be described herein.

The system hub 110 comprises a second memory 113, configured to store information, such as item shipping information, verification information, user information, and payment information. The second memory 113 may comprise a database, a comma delimited file, a text file, or the like. The system hub 110 generates a unique identifier for each item upon receipt of any item information regarding the purchase of an item, which may include the information described above. The system hub 110 is configured to associate the item information stored in the second memory 113 for each item with the unique identifier for each item, and to store the association in the second memory 113. The system hub 110 is configured to coordinate and direct the activities of the components of the system 100, and to coordinate providing users the ability to purchase a landed cost guarantee from the landed cost guarantee system. In some embodiments, the first memory 112 and the second memory 113 may be a single memory.

In some embodiments, the processor 111 is connected to a communication feature 114. The communication feature 114 is configured for wired, and/or wireless communication. In some embodiments, the communication feature 114 communicates via telephone, cable, fiber-optic, or any other wired communication network. In some embodiments, the communication feature 114 may communicate via cellular networks, WLAN networks, or any other wireless network. The communication feature 114 is configured to receive instructions and to transmit and receive information among components of the system 100, and in some embodiments, with a central server (not shown) or other resource outside the system 100, as desired.

In some embodiments, the system hub 110 is in communication with the API 120. The API 120 is configured to allow users to send information to, issue commands to, and receive information from the system 100. In some embodiments, the API 120 may be a Web API running on a host server. In some embodiments, the system hub 110 may be the host server that the API 120 is running on. In some embodiments, users may send JSON, XML, or HTTP requests to the system 100 through the API 120 and the API 120 will respond to the user using JSON, XML, or HTTP.

The API 120 allows users to request information and issue commands to the system 100. The API 120 may be customizable for a particular user, such as an online retailer (e-tailer). In some embodiments, using the API 120, a user may send item shipping information to the system. For example, shipping information could include the item's contents, shipping destination, drop off location, pick up location, and weight to the system 100 through the API 120. In some embodiments, the user, through the API 120, may request a landed cost estimate from the system 100 based on the shipping information. A landed cost estimate is an estimate of the cost due at the shipping destination once the item has arrived. For example, the landed cost estimate could include an estimate of the fees, taxes, and tariffs due for an international shipment. In some embodiments, the user may request the amount of the landed cost guarantee fee from the system 100 using the API 120. The landed cost guarantee fee is the fee associated with providing a guarantee that the actual landed cost will not exceed the landed cost estimate. In some embodiments, the user can command the system 100 to generate a shipping label for an item using the API 120. In some embodiments, the shipping label is then communicated to the user over the API 120. In some embodiments, the shipping label designates an item as an item for which a landed cost guarantee has been purchased. In some embodiments, users may submit customer information to the system 100 using the API 120. For example, users could submit information about the sender of the item, such as the sender's address, email address, or phone number. Users could also submit information about the receiver of the item such as the receiver's address, email address, or phone number. Users could also submit a customer number to the system 100 where the customer number is already associated with a customer's address, email address, or phone number.

In some embodiments, the system hub 110 is in communication with the landed cost module 170. The landed cost module 170 may comprise a processor, memory, databases, address and control lines, and other components similar to those described herein for the system hub 110. In some embodiments, the landed cost module 170 may be configured to use the processor, memory, databases, address and control lines, and other components of the system hub 110, or a combination of its own components and the system hub 110's components.

The landed cost module 170 is configured to calculate the landed cost estimate and the amount of the landed cost guarantee fee. In some embodiments, the landed cost module 170 can calculate the landed cost estimate using a database containing estimates of the taxes, tariffs, and/or fees associated with shipping items to different countries or destinations. In some embodiments, the landed cost module 170 can calculate the amount of the landed cost guarantee fee in part based on a flat fee that is adjusted based in part on historical data collected by the system 100 on the accuracy of the landed cost estimate. For example, if historical data shows that actual landed cost is unpredictable, then the landed cost module 170 may increase the amount of the landed cost guarantee fee. In some embodiments, the landed cost module 170 can calculate the landed cost estimate in part based on historical data collected by the system 100 on the accuracy of the landed cost estimate. For example, if historical data shows that the landed cost estimate is usually lower than the actual landed cost, the landed cost module 170 will increase the landed cost estimate. In some embodiments, the landed cost module 170 could use the system and methods for calculating the landed cost described in U.S. patent application Ser. No. 14/207,086, filed Mar. 12, 2014, entitled "Export preparation and support system and method," hereby incorporated by reference, to calculate the landed cost estimate.

In some embodiments, the system hub 110 is in communication with the shipping label module 160. In some embodiments, the shipping label module 160 may comprise a processor, memory, databases, address and control lines, and other components similar to those described herein for the system hub 110. In some embodiments, the shipping label module 160 may be configured to use the processor, memory, databases, address and control lines, and other components of the system hub 110 or a combination of its own components and the system hub 110's components. In some embodiments, the shipping label module 160 may also include a printer 161 for printing shipping labels.

The shipping label module 160 is configured to generate shipping labels. In some embodiments the shipping label module 160 is configured to generate the shipping label based on some combination of the item shipping information and whether or not a landed cost guarantee was purchased for the item. The shipping label can include a unique identifier for that item. In some embodiments, the shipping label designates that the landed cost guarantee has been purchased for that item. In some embodiments, the shipping label module 160 is configured to print out the shipping label using a printer.

In some embodiments, the system hub 110 is in communication with the communication module 140. The communication module 140 may comprise a processor, memory, databases, address and control lines, and other components similar to those described herein for the system hub 110. In some embodiments, the communication module 140 may be configured to use the processor, memory, databases, address and control lines, and other components of the system hub 110 or a combination of its own components and the system hub 110's components.

In some embodiments, the communication module 140 is configured to send information to entities that the entity can use to submit a reimbursement claim to the system 100. In some embodiments, the communication module 140 communicates with the entity via mail, email, text message, automated phone call, or some combination of any of these options. For example, the communication module 140 can send an entity a landed cost guarantee identifier that uniquely identifies an item for which the landed cost guarantee has been purchased. The communication module 140 can also communicate specific instructions for how the entity can submit a reimbursement claim. For example, the communication module 140 could instruct the entity to go to a certain website and submit certain documentation to the system 100 in order to receive reimbursement.

In some embodiments, the system hub 110 is in communication with the verification module 130. The verification module 130 may comprise a processor, memory, databases, address and control lines, and other components similar to those described herein for the system hub 110. In some embodiments, the verification module 130 may be configured to use the processor, memory, databases, address and control lines, and other components of the system hub 110 or a combination of its own components and the system hub 110's components.

In some embodiments, the verification module 130 is configured to receive information from entities to verify that the actual landed cost was greater than the estimated landed cost. In some embodiments, the verification module 130 receives information from entities via mail or email. For example, entities could submit documentation from a foreign post office on the amount of tariffs or fees needed to deliver an item to the verification module 130 via mail or email. In some embodiments, the information submitted by the entity could be a receipt from the other post office. In some embodiments, the information submitted by the item sender could be a notice from an e-tailer of the actual cost of shipping an item, which will be described in greater detail below. In some embodiments, the verification module 130 can receive direct electronic communication from an entity that discloses the actual landed cost.

In some embodiments, the verification module 130 contains a verification website 131. In some embodiments, the verification website 131 can be hosted on a webserver. In some embodiments, the webserver utilizes the processor, memory, databases, address and control lines of the verification module 130. In some embodiments, the verification website 131 utilizes the processor, memory, databases, address and control lines, and other components of the system hub 110 or a combination of the verification module 130's components and the system hub 110's components. Users of the system 100 can use the verification website 131 to submit information to the verification module 130. For example, using the verification website 131, the entity could submit an electronic copy of documentation from a foreign post office on the amount of tariffs or fees needed to deliver an item or an electronic copy of a notice from the e-tailer of the actual cost of shipping an item.

In some embodiments, a foreign post office could submit actual landed cost information directly to the landed cost guarantee system using the verification module 130. This information can be later used to verify a reimbursement claim submitted by a sender or recipient, as will be described below. For example, a foreign post office could submit a receipt or other documentation that shows the actual landed cost of an item via email, mail, the verification website 131, or other electronic means.

In some embodiments, the system hub 110 is in communication with the reimbursement module 150. The reimbursement module 150 may comprise a processor, memory, databases, address and control lines, and other components similar to those described herein for the system hub 110. In some embodiments, the reimbursement module 150 may be configured to use the processor, memory, databases, address and control lines, and other components of the system hub 110 or a combination of its own components and the system hub 110's components.

In some embodiments, the reimbursement module 150 is configured to reimburse entities who have verified that the actual landed cost was greater than the landed cost estimate. For example, the reimbursement module 150 can issue a check to the customer for the amount that the actual landed cost exceeded the landed cost estimate. In some embodiments, the reimbursement module 150 can credit an account held electronically by the entity that ships the item. For example, if the e-tailer 230 keeps a standing account with the entity that ships the item, the reimbursement module 150 can credit the e-tailer 230's account. The reimbursement module 150 can also be configured to return any money collected to pay the landed cost estimate when the landed cost estimate exceeds the actual landed cost.

In some embodiments, the system hub 110 is in communication with the transaction module 180. In some embodiments, the transaction module 180 may comprise a processor, memory, databases, address and control lines, and other components similar to those described herein for the system hub 110. In some embodiments, the transaction module 180 may be configured to use the processor, memory, databases, address and control lines, and other components of the system hub 110, or a combination of its own components and the system hub 110's components.

In some embodiments, the transaction module 180 is configured to receive and disburse money for shipping items. In some embodiments, the transaction module 180 is configured to collect money from entities that purchase the landed cost guarantee and disburse money to national post office systems to pay for shipping of that item. In some embodiments, the transaction module 180 can receive and disburse money by crediting or debiting electronic accounts. In some embodiments, the transaction module 180 can receive and disburse cash or check payments.

Figure 2:
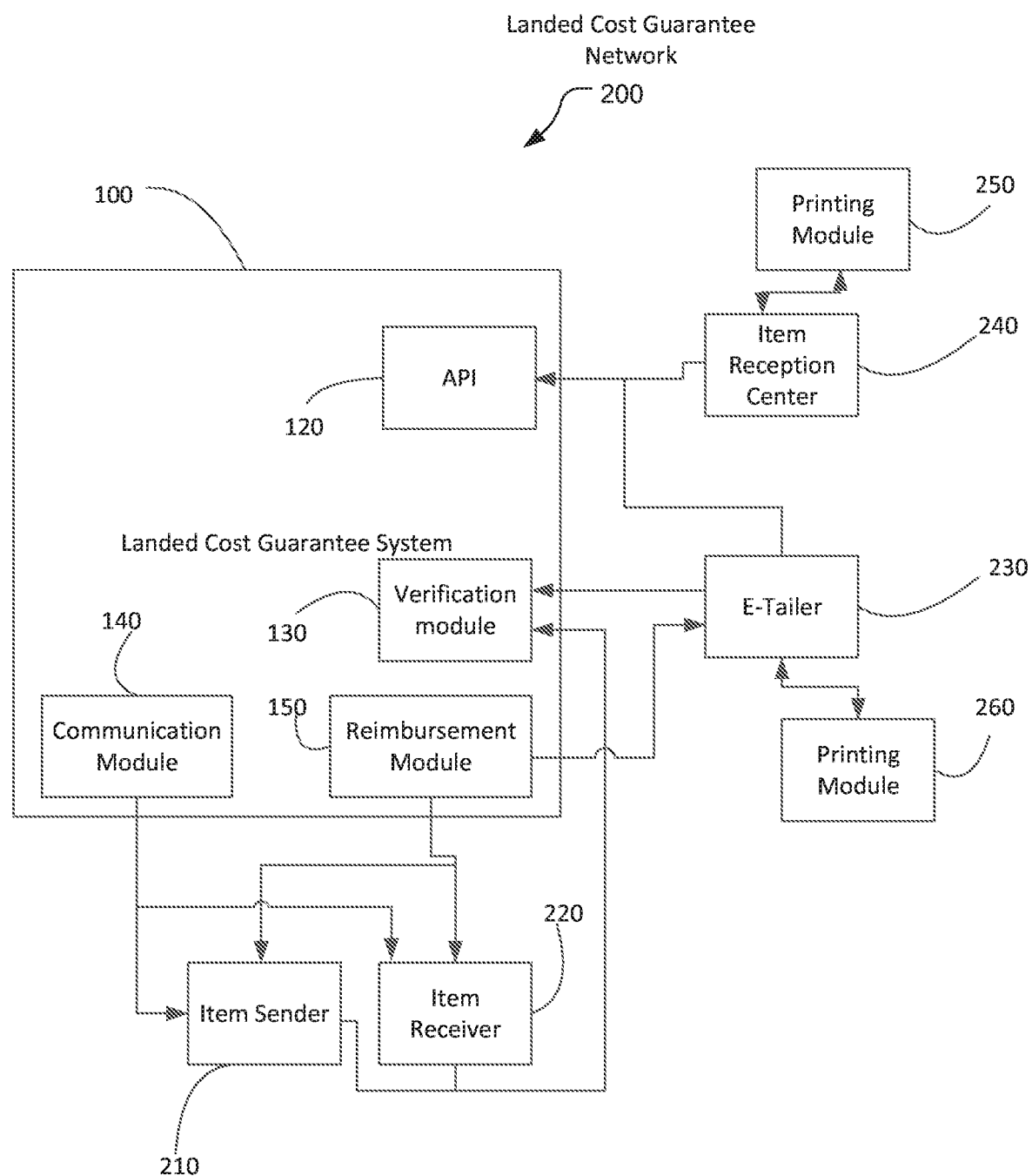
FIG. 2 is a block diagram of an embodiment illustrating how various users of the landed cost guarantee system interact with the landed cost guarantee system.

FIG. 2 is an example of the landed cost guarantee network 200. In this example, the system 100 is in communication with an item reception center 240, the e-tailer 230, an item sender 210, and an item receiver 220. The system 100 can communicate with the item reception center 240 through the API 120. The system 100 can communicate with the e-tailer 230 through the API 120 and can also receive communications from the e-tailer 230 through the verification module 130. The item sender 210 and the item receiver 220 can receive communications from the system 100 through the communication module 140 and the reimbursement module 150. The item sender 210 and the item receiver 220 can also receive communications through the reimbursement module 150.

In some embodiments, the item sender 210 can be any entity that wishes to have an item shipped. For example, the item sender 210 can be a person or a business. In some embodiments, the e-tailer 230 can also be the item sender 210. As described above, the system 100 can be configured to utilize the communication module 140 to send information to the item sender 210 that the item sender 210 can use to submit verification information to the system 100. As also described above, the system 100 can be configured to send a reimbursement to the item sender 210 using the reimbursement module 150. Finally, as described above, the system 100 can be configured to accept verification information from the item sender 210 through the verification module 130. This process will be described in greater detail below.

In some embodiments, the item receiver 220 is an entity that the item sender 210 wishes to send an item to. For example, the item receiver 220 can be a person or a business. As described above, the system 100 can be configured to utilize the communication module 140 to send information to the item receiver 220 that explains to the item receiver 220 how to use the verification module 130 to submit information to the system 100. As also described above, the system 100 can be configured to send a reimbursement to the item receiver 220 using the reimbursement module 150. Finally, as described above, the system 100 can be configured to accept information that verifies the actual landed cost from the item receiver 220 through the verification module 130.

In some embodiments, the system 100 communicates with the e-tailer 230. The e-tailer 230 can be an online store, a website, or a kiosk that the item sender 210 wishes to purchase items from. For example, the e-tailer 230 can have a website through which the item sender 210 can purchase items and have them shipped to destinations. The e-tailer 230 can communicate with the system 100 using the API 120, as described above. In some embodiments, the e-tailer 230 can also submit verification information to the system 100 through the verification module 130 and receive reimbursements through the reimbursement module 150. When the e-tailer 230 is acting as the item sender 210, it can also receive information on how to submit a reimbursement claim through the communication module 140.

The e-tailer 230 can be connected with a printing module 260. The printing module 260 may comprise a processor, memory, databases, address, control lines, and a printing device. When the e-tailer 230 receives item shipping label information from the system 100 over the API 120, the printing module 260 can be used to print the shipping label. The shipping label can contain information as described above.

In some embodiments, the system 100 communicates with the item reception center 240. The item reception center 240 can be any place that receives items for shipping. For example, the item reception center 240 can be any national postal service office or another similar distribution entity. The item reception center 240 can communicate with the system 100 using the API 120, as described above.

The item reception center 240 can be connected with a printing module 250. The printing module 250 may comprise a processor, memory, databases, address, control lines, and a printing device. When the item reception center 240 receives the item shipping label information from the system 100 over the API 120, printing module 250 can be used to print the shipping label. The shipping label can contain information as described above.

Figure 3:
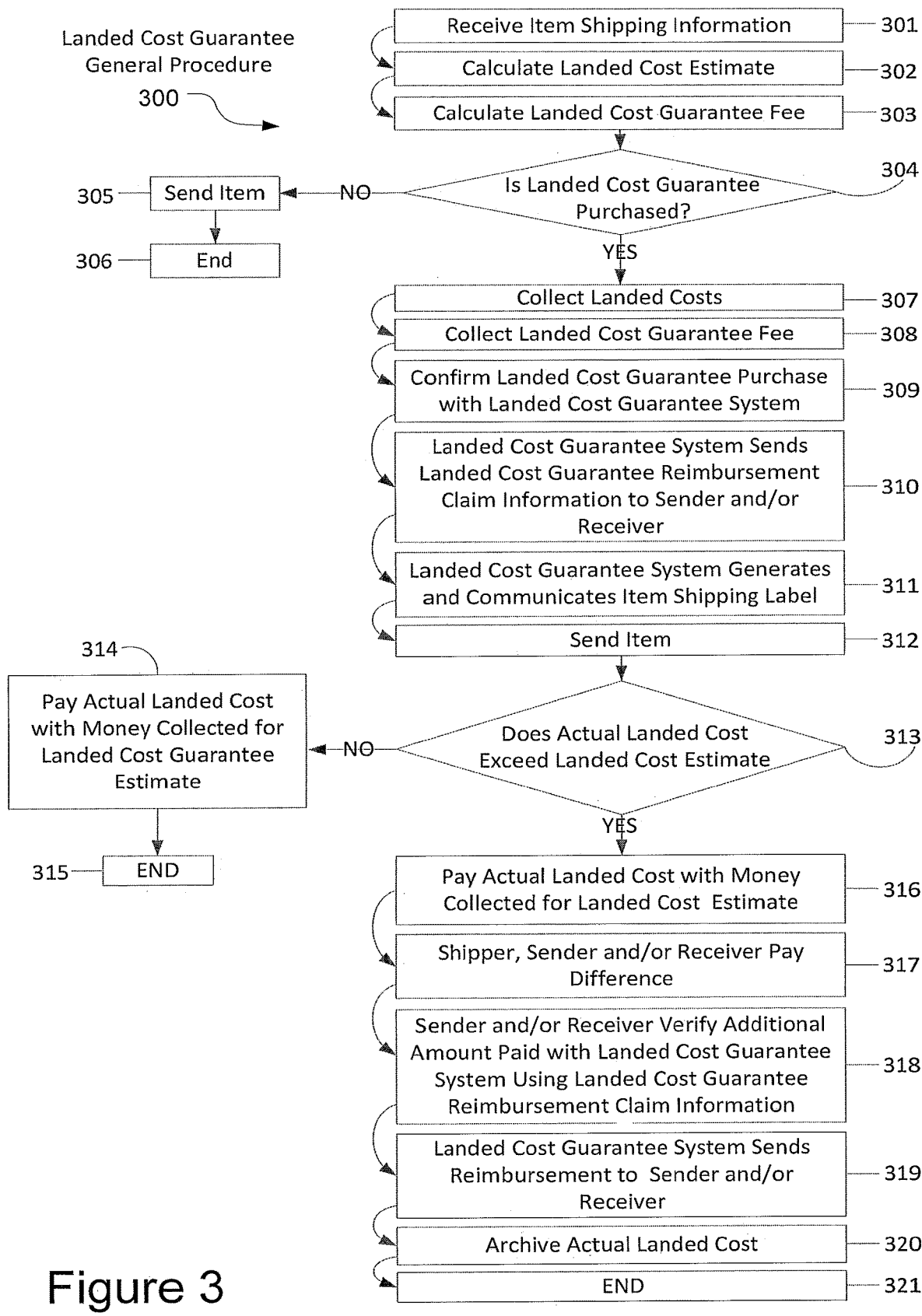
FIG. 3 is a flow chart depicting an embodiment of a process for using the landed cost guarantee system to provide landed cost guarantees.

FIG. 3 shows a general process 300 for using the landed cost guarantee system. The process 300 starts at a process block 301. At the process block 301, the landed cost guarantee system receives item shipping information. For example, if the item sender 210 wishes to send an item to France, either an item reception center 240 or the e-tailer 230 can send the item shipping information, which can include the destination or recipient address, the return or sender address, class of service, identity of the item, special handling requirements, the weight of the item, or other characteristic of the item, to the system 100 using API 120. The process then proceeds to a process block 302.

At the process block 302, the landed cost module 170 calculates the landed cost guarantee estimate. For example, the landed cost guarantee system could calculate a landed cost estimate based on the tariffs and fees associated with sending the item to France. The landed cost guarantee system can use the item shipping information to identify the appropriate tariffs, taxes, and fees for shipping the item internationally, on which to base the landed cost estimate. The landed cost estimate is collectible from the item sender 210 or the e-tailer 230 prior to sending the item, and as part of the fee for sending the item. The process then moves to a process block 303.

At the process bock 303, the landed cost module 170 calculates the fee associated with providing a landed cost guarantee to an entity. In some embodiments, this fee can be a flat fee for any item sender 210 who wishes to purchase the landed cost guarantee. In some embodiments, the landed cost module 170 can access a database of historical landed costs compared to estimated landed costs and update the fee based on this comparison. For example, if the system has historically predicted the actual landed cost with high accuracy when shipping to France, the landed cost guarantee fee might be lower. The process then moves on to a decision block 304.

In the decision block 304, the item sender 210 chooses whether to purchase the landed cost guarantee. For example, if the item sender 210 wishes to ship to France, the e-tailer 230 or item reception center 240 will offer the item sender 210 the option to purchase the landed cost guarantee. In another example, the item reception center 240 or the e-tailer 230 might itself be the entity paying for shipping of the item, and thus will decide whether to purchase the landed cost guarantee. If the item sender 210 or e-tailer 230 chooses not to purchase the landed cost guarantee, the process proceeds to a process block 305. In the process block 305, the tariffs, taxes, and fees are collected or paid, the item is shipped, and the process ends.

If the item sender 210 or the e-tailer 230 chooses to purchase the landed cost guarantee in the decision block 304, the process proceeds to a process block 307. In the process block 307, the estimated landed cost is collected from the item sender 210 or the e-tailer 230. For example, the item reception center 240 or the e-tailer 230 can collect the estimated landed cost from the item sender 210 and then forward the payment to the transaction module 180. In some embodiments, the item reception center 240 or e-tailer 230 may provide the landed cost estimate directly to the transaction module 180. The process then proceeds to a process block 308.

In the process block 308, the landed cost guarantee fee is collected from the item sender 210 or the e-tailer 230 and received into the transaction module 180 via the API 120. The landed cost guarantee fee can be collected in a similar manner as the landed cost guarantee estimate. The process then proceeds to a process block 309.

In the process block 309, the system 100 receives information confirming the purchase of the landed cost guarantee via the API 120. For example, in some embodiments, the e-tailer 230 or the item reception center 240 sends confirmation information that confirms the purchase of the landed cost guarantee using the API 120, and associates the landed cost guarantee fee payment with an account and with the item. The landed cost guarantee fee payment can be associated with the item shipping information for the item to be shipped. In some embodiments, the confirmation includes details about who purchased the confirmation. These confirmation details can include a name, address, email addresses, phone numbers, customer information numbers identifying customer payment accounts, or any other information useful in identifying or communicating with the customer. For example, if the item sender 210 wished to send an item to France, the item sender 210 could give his or her name and email address to the e-tailer 230 or item reception center 240, which would then forward it on to the landed cost guarantee system via the API 120. The process then proceeds to a process block 310.

In the process block 310, the communication module 140 sends information on how to claim a reimbursement if the actual landed cost exceeds the landed cost estimate to the item sender 210, item receiver 220, or e-tailer 230. This information on how to claim reimbursement could include the URL of the verification website 131, a physical address of the place a person could send a reimbursement claim to, an email address that a person could send a reimbursement claim to, an account number, or any other information. For example, the landed cost guarantee system can use the communication module 140 to send an email to the item sender 210 of the URL of the verification website 131. The landed cost guarantee system can also send a list of the types of verification information that the entities can submit, such as a list of documentation from the French or other countries' national post that can be used to verify the information. The process then proceeds to a process block 311. The information on how to claim a reimbursement is sent to the item sender 210, the item recipient 220, and/or the e-tailer 230, for use in the future, if the actual landed cost exceeds the landed cost estimate.

In the process block 311, the system 100 generates a shipping label for the item to be shipped using the shipping label module 160. For example, the shipping label can contain information designating that the item will be shipped to a destination in France and that a landed cost guarantee has been purchased for the item. The system 100 can communicate the item shipping label to the item reception center or the e-tailer 230 via the API 120, which can then use their respective printing modules to print out the item shipping label and attach it to the item for shipping. The item shipping label is printed having a computer readable identifier which encodes information relating to the item shipping information and the landed cost guarantee fee. The process then proceeds to a process block 312.

In the process block 312, the item is actually shipped to its destination by the shipper, such as the United States Postal Service and/or a foreign shipping service. The process the proceeds to a decision block 313.

In the decision block 313, the actual landed cost is determined and communicated. For example, when an item is shipped to France, the actual landed cost is determined by the French national postal service or by a distribution entity in France including any taxes, tariffs, and fees associated with importing that item into France. The French national postal service scans the label having the computer readable code encoding the landed cost guarantee information. When the French national postal service identifies that the item is associated with a landed cost guarantee, the tariffs, taxes, and fee amounts are transmitted to the system 100, where any of the item receiver 220, the item sender 210, or the item shipper can determine whether the actual landed cost exceeds the landed cost estimate. If the actual landed cost does not exceed the landed cost estimate, then the process proceeds to a process block 314. In some embodiments, the French, or any international distribution entity, sends the landed cost amount to the domestic distribution entity, or system 100, for every item received from the domestic distribution entity. The item sender 210, item receiver 220, e-tailer 230, or the item shipper can receive information from the system 100 regarding whether the actual landed cost exceeds the landed cost estimate.

In the process block 314, the actual landed cost is paid using the moneys collected based on the landed cost estimate in the process block 307. In some embodiments, any money collected in excess of the actual landed cost can be refunded to the entity that purchased the landed cost guarantee. This can be accomplished via the reimbursement module 150. The process 300 then ends.

If the actual landed cost exceeds the landed cost estimate, the process then proceeds to a process block 316. In the process block 316, the item shipper uses the money collected for the landed cost estimate to pay as much of the landed cost as possible. In some embodiments the money is both collected by and disbursed by the transaction module 180. For example, if the United States Postal Service is shipping an item to France, the United States Postal Service would pay as much of the landed cost as possible using the monies collected for the landed cost estimate. The process then proceeds to a process block 317.

In the process block 317, the item shipper, item sender 210, or item receiver 220 pays the difference between the landed cost estimate and the actual landed cost. In some embodiments, the item shipper can use the transaction module 180 to pay the difference. For example, the French distribution network identifies an item as having a landed cost guarantee based on a scan of the computer readable code on item label. The computer readable code can be a barcode or other type of computer readable code, and can be a unique identifier for the item. The unique identifier can include information regarding the purchase of the landed cost guarantee. The French distribution network can automatically communicate information relating to the computer readable identifier on the label to system 100 via the communication module 140, and communicate the difference between the actual landed cost and the estimated landed cost, or the landed cost amount already paid. The French distribution network can send a receipt, invoice, or other document via electronic or physical communication means, indicating the actual landed cost. The system 100 receives the computer readable identifier or information relating thereto and the receipt, invoice, or other document showing actual landed cost and/or the difference between the landed cost estimate and actual landed cost. This information can be stored in the system 100, such as in the transaction module 180 and/or the reimbursement module 150. The system 100 uses the information related to the computer readable code, or the item unique identifier, to determine the shipper 210 or e-tailer 230 of the item based on the stored item shipping information. The system 100 communicates with the sender 210 or e-tailer 230 regarding difference between actual and estimated landed cost. The sender 210 or e-tailer can, via the API 120 provide a payment or account number to the system 100 to process the payment. In some embodiments, the sender 210 or e-tailer 230 has registered with the system 100, and the transaction module 180 automatically debits or charges an account or credit card associated with the sender 210 or e-tailer 230.

In some embodiments, the item recipient 220 pays the difference between actual and estimated landed cost directly to the French distribution entity, and receives a receipt or other document confirming the transaction and payment of the difference. This receipt can be sent to the item recipient 220 electronically, physically, or both. The receipt can also be sent to the system 100 to be stored in the system 100, such as in the transaction module 180 and/or the reimbursement module 150.

In some embodiments, the distribution network, such as the USPS, can automatically pay the difference between estimated and actual landed cost upon a notification from a foreign distribution entity. For example, when USPS receives a communication from the French national postal service, including the unique identifier and identifier of a purchased landed cost guarantee fee, the USPS will automatically provide a payment to the French national postal service equal to the difference between the actual and estimated landed cost. Thus, the item receiver 220, the item sender 210, and e-tailer 230 will not need to take any further action. In this case, the process can skip to process block 320. However, if the item sender 210 or the item receiver 220 pays any portion of the difference, the process proceeds to a process block 318. In some embodiments, the recipient of the item pays the difference and submits documentation for reimbursement, which will be described in greater detail below.

In the process block 318, the item sender 210 and/or the item receiver 220 verify the additional amount paid with the landed cost guarantee system. To accomplish this, the item sender 210 or item receiver 220 can use the reimbursement information provided by the communication module 140 in the process block 310. The item sender 210 or item receiver 220 can verify the amount paid with the landed cost guarantee system by submitting verification information to the system using the verification module 130. For example, the item receiver 220 could go the website provided in the reimbursement information and submit a scanned copy of the receipt they received from the French national postal service that shows the amount that the item receiver 220 paid in excess of the landed cost estimate. The process then proceeds to process a block 319. In some embodiments, the item sender 210, if he paid the difference between actual and landed cost, can submit documentation or evidence of his payment, such as a payment receipt, a confirmation number received from the system 100, and the like.

In the process block 319, the reimbursement module 150 receives the information or documentation provided by the item sender 210 or item receiver 220 via the API 120, and compares the provided information or documentation with the record of payment in the system 100, such as in the transaction module 180. For example, the reimbursement module 150 receives the electronic receipt or documentation the French distribution entity provided to the system 100. The reimbursement module 150 compares the information or documents provided by the item recipient 220 with those from the French distribution entity to determine whether there is a valid claim for reimbursement. If the document from the item recipient 220 and the French distribution entity match or correspond, such as having the same confirmation number, or through a visual analysis of scanned or electronic images, the reimbursement module 150 provides a reimbursement in the amount of the difference between the estimated and actual landed cost. The reimbursement module 150 can credit an account registered with the system 100, or can instruct a financial institution to mail a check, or may provide a cash or check reimbursement at an item reception center 240.

In some embodiments, the landed cost guarantee system can use the reimbursement module 150 to issue reimbursements. In some embodiments, the landed cost guarantee system can reimburse the party that submitted the verification information or any person that the person who submits the verification information selects. For example, the item receiver 220 could select the item sender 210 to receive the reimbursement, or similarly, the item sender 210 could select the item receiver 220. The landed cost guarantee system can reimburse the item sender 210 or item receiver 220 by either issuing a check or by crediting a customer account. For example, the reimbursement module 150 can issue a check to the party that submitted the receipt from the French distribution entity that shows the amount paid in excess of the estimated landed cost. The process then proceeds to a process block 320.

In the process block 320, the actual landed cost is archived by the landed cost guarantee system. In some embodiments, the verification module 130 can communicate the actual landed cost to the system hub 110, which then uses the memory 133 to store the actual landed cost. This archive of actual landed costs can then be used by the landed cost module 170 to calculate landed cost estimates and landed cost guarantee fees. The actual landed costs can be stored, along with the item information associated with the actual landed costs to set a baseline for estimating landed cost fees in the future. These estimates can be used to provide landed cost estimates as outlined in the process blocks 302 and 303.

Figure 4:
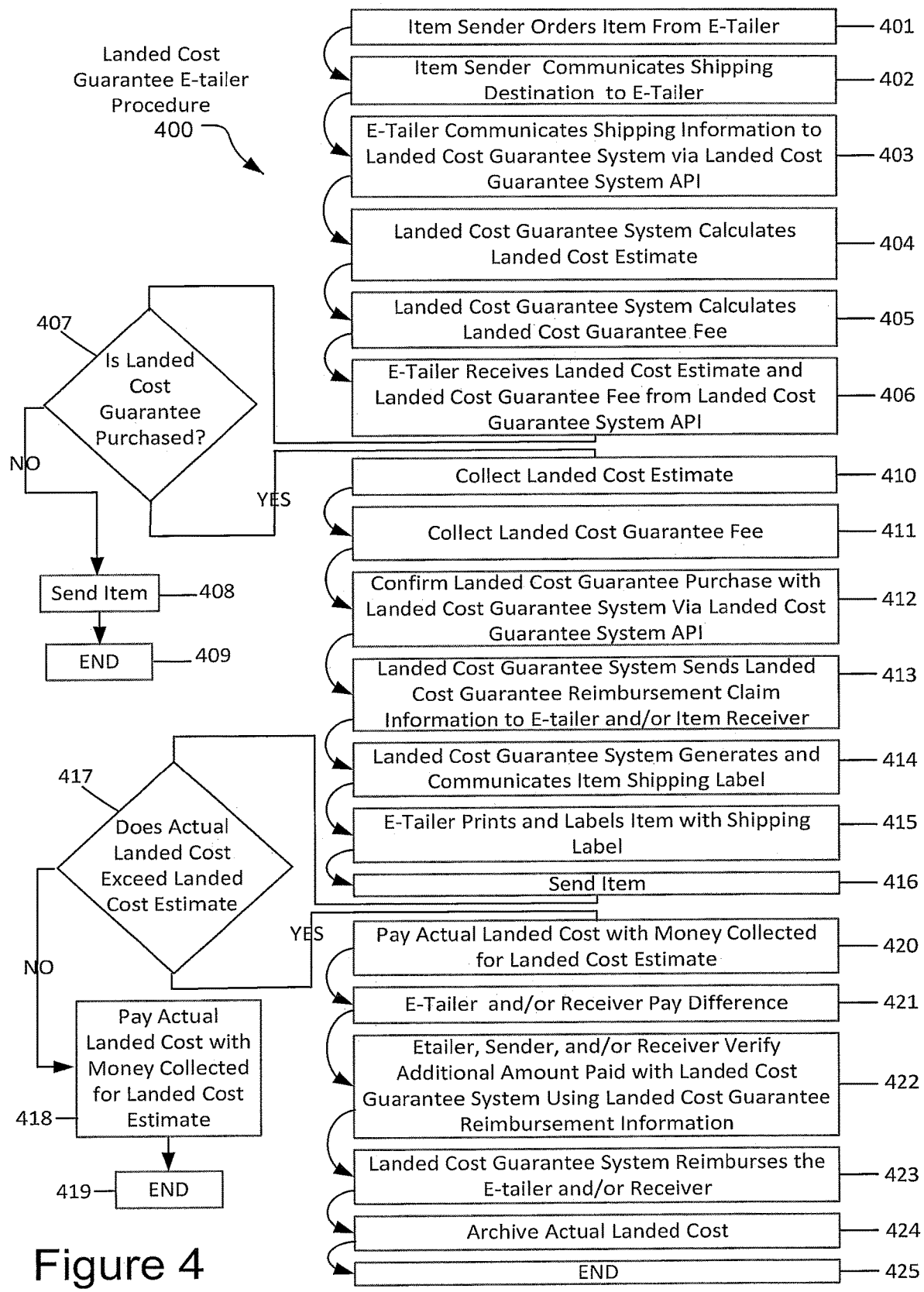
FIG. 4 is a flow chart depicting an embodiment of a process for using the landed cost guarantee system in conjunction with an electronic retailer.

FIG. 4 shows a process 400 for using the landed cost guarantee system in conjunction with the e-tailer 230. The processes described in process 400 are similar to or are the same as those described in greater detail with regard to process 300. The process 400 starts at a process block 401. In the process block 401, the item sender 210 orders an item from the e-tailer 230. For example, in some embodiments, the item sender 210 orders a jacket from the L. L. Bean e-tailer website. The process then proceeds to a process block 402.

In the process block 402, the item sender 210 communicates the shipping destination of the item to be shipped by the e-tailer 230 via the API 120. For example, if the item sender 210 lives in France, the item sender 210 could submit the location in France that the item is to be shipped to. Similarly, if the item sender 210 is giving a gift to a person in France, the item sender 210 would submit to the e-tailer 230 the address of the person who the item will be shipped to. The process then proceeds to a process block 403.

In the process block 403, the e-tailer 230 communicates shipping information to the landed cost guarantee system using the API 120. For example, the e-tailer L. L. Bean could communicate shipping information such as where the jacket is going to be shipped to, where the jacket is going to be shipped from, how much the jacket weighs, how large the package will be, as well as other useful information. The process then proceeds to a process block 404.

In the process block 404, the landed cost guarantee system calculates the landed cost estimate. For example, the estimate could be calculated by the landed cost module 170 using the shipping information provided by e-tailer L. L. Bean. The process then proceeds to a process block 405.

In the process block 405, landed cost guarantee system calculates the landed cost guarantee fee associated with providing the landed cost guarantee. For example, the fee could be calculated by the landed cost module 170 based on the historical accuracy of calculating the landed cost estimate for sending an item to France. The process then proceeds to a process block 406.

In the process block 406, the e-tailer 230 receives the landed cost estimate and the landed cost guarantee fee via the API 120. For example, the L. L. Bean e-tailer could receive from the API 120 the landed cost estimate and the landed cost guarantee fee associated with shipping the jacket to a location in France. The process then proceeds to a decision block 407.

In the decision block 407, the item sender 210 is offered the opportunity to purchase the landed cost guarantee. For example, the purchaser of the jacket could choose to purchase a landed cost guarantee. In another example, the e-tailer 230 itself could choose to purchase the landed cost guarantee if the e-tailer 230 is paying for shipping. If the item sender 210 or e-tailer 230 does not purchase the landed cost guarantee, the process then proceeds to a process block 408. In the process block 408, the item is sent and the process then ends in the process block 409.

If the item sender 210 or e-tailer 230 does purchase the landed cost guarantee, the process then proceeds to a process block 410. In the process block 410, the landed cost guarantee estimate is collected from the item sender 210 or e-tailer 230 using the transaction module 180. For example, the landed cost estimate associated with shipping a jacket to a location in France could be collected from the item sender 210 or e-tailer 230 via online payment using the e-tailer 230's systems. The amount collected can then be forwarded on to the transaction module 180. The process then proceeds to a process block 411.

In the process block 411, the landed cost guarantee fee is collected from the item sender 210 or e-tailer 230 using the transaction module 180. For example, the landed cost guarantee fee associated with shipping a jacket to France could be collected from the item sender 210 or the e-tailer 230. The amount collected can then be forwarded on to the item shipper. The process then proceeds to a process block 412.

In the process block 412, the purchase of the landed cost guarantee is confirmed with the landed cost guarantee system. The confirmation can be accompanied by any information needed by the landed cost guarantee system to contact the item sender 210 or the e-tailer 230. This information could be the item sender 210 or the e-tailer's 230 address, email address, or telephone number. For example, if the L. L. Bean e-tailer is the purchaser of the landed cost guarantee information, this information could be the address, email address, or telephone number used to contact the employee of L. L. Bean designated for dealing with the landed cost guarantee system. If the item sender 210 purchased the landed cost guarantee, then the information could be that person's address, email address, or telephone number. The process then proceeds to a process block 413.

In the process block 413, the landed cost guarantee system sends landed cost guarantee reimbursement claim information to the item sender 210 or the e-tailer 230. As explained, this information on how to claim reimbursement could include the address of a website through which the item sender 210 or the e-tailer 230 could submit a reimbursement claim, a physical address of the place a person could send a reimbursement claim to, or any other information. The information could also include the types of documents that need to be submitted in order for a reimbursement claim to be successful. The process then proceeds to a process block 414.

In the process block 414, the landed cost guarantee system generates and communicates the item shipping label. For example, the landed cost guarantee system could generate a shipping label that shows that the package containing the jacket purchased from L. L. Bean is being shipped to France and that the landed cost guarantee has been purchased for the package. The landed cost guarantee system could then send this shipping label to the L. L. Bean e-tailer via the API 120. The process then proceeds to a process block 415.

In the process block 415, the e-tailer 230 prints the shipping label and labels the item to be shipped with the shipping label. For example, the e-tailer L. L. Bean could print the shipping label generated for the package containing the jacket to be shipped to France and then label the package with the shipping label. The shipping label contains a unique identifier identifying the item. In some embodiments, the unique identifier can encode an indication of a purchase of the landed cost guarantee. In some embodiments, the unique identifier is associated in a memory of the system 100 with a purchase of a landed cost guarantee. The process then proceeds to a process block 416.

In the process block 416, the item is shipped. For example, the package containing the jacket could be shipped to France. The process then proceeds to a decision block 417.

In the decision block 417, it is determined whether the actual landed cost exceeds the landed cost estimate. The French distribution entity can send the system 100 information about the actual landed cost. In some embodiments, the item shipper, e-tailer 230, or the item receiver 220 can make this determination. In some embodiments, the item shipper can make this determination by comparing how much is the foreign national post office is charging for the actual landed cost with the amount collected by the transaction module 180 for the landed cost estimate. If the actual landed cost does not exceed the landed cost estimate, then the process proceeds to a process block 418.

In the process block 418, the actual landed cost is paid with the money collected for the landed cost estimate and the process then ends in a process block 419.

If the actual landed cost exceeds the landed cost estimate, the process proceeds to a process block 420. In the process block 420, the actual landed cost is paid in part with the money collected for the landed cost estimate. The process then proceeds to a process block 421.

In the process block 421, the e-tailer 230 or the item receiver 220 pays the difference between the actual landed cost and the landed cost estimate. In some embodiments, the e-tailer 230 or item receiver 220 can receive a receipt from the national post office that details the difference in how much they paid. The process then proceeds to a process block 422.

In the process block 422, the e-tailer 230, item sender 210, or the item receiver 220 of the item verifies the amount paid in excess of the landed cost estimate using the information received in the process block 413. For example, either e-tailer L. L. Bean or the item sender 210/receiver 220 could go to a website designated in the reimbursement claim information and submit scanned copies of the receipt that they received from the French national post service. The process the proceeds to a process block 423.

In the process block 423, the landed cost guarantee system reimburses the e-tailer 230 and/or the item receiver 220. For example, the landed cost guarantee system could issue and mail a check to the item receiver 220 or e-tailer 230. Or the system could reimburse the e-tailer 230's customer account that the system can access. The process then proceeds to a process block 424.

In the process block 424, the landed cost guarantee system archives the actual landed cost paid for delivery of the item. For example, the system could archive the actual landed cost of shipping a jacket to France. The process then ends in a process block 425.

Figure 5:
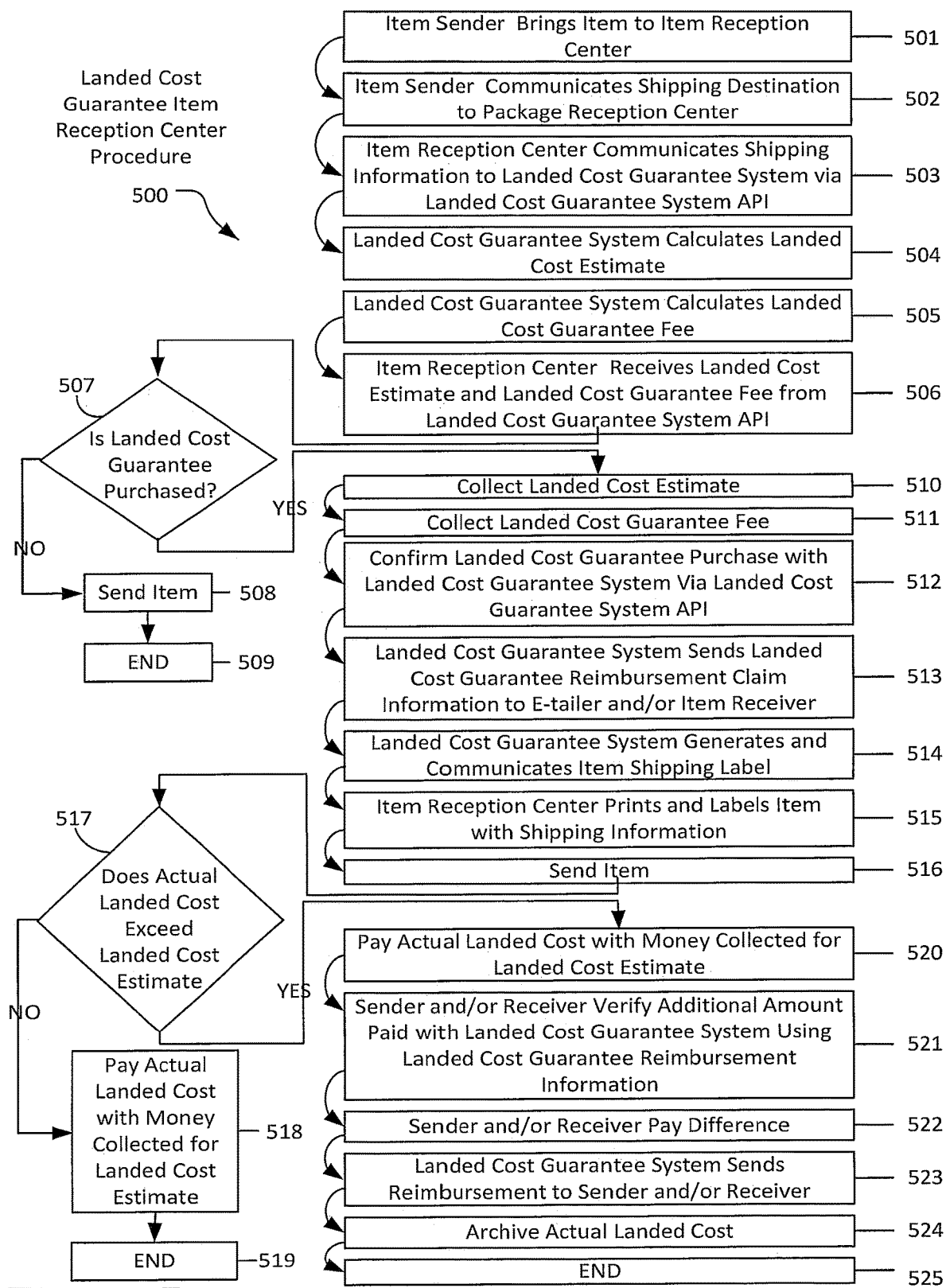
FIG. 5 is a flow chart depicting an embodiment of a process illustrating the use of the landed cost guarantee system in conjunction with an item reception center.

FIG. 5 shows a process 500 for using the landed cost guarantee system in conjunction with the item reception center 240. The processes and details of the transactions/process blocks described in process 500 can be similar to those described above with regard to process 300. The process 500 starts at a process block 501. In the process block 501, the item sender 210 brings an item to an item reception center 240. For example, the item sender 210 could bring a package containing a jacket. The process then proceeds to process block 502.

In the process block 502, the item sender 210 communicates the shipping destination of the item to be shipped to the item reception center 240. For example, if the item sender 210 wishes for the item to be shipped to a location in France, the item sender 210 would enter the address of the person who the item will be shipped to. The process then proceeds to a process block 503.

In the process block 503, the item reception center 240 communicates shipping information to the system hub 110 using the API 120. For example, the item reception center 240 could communicate shipping information to the landed cost guarantee system such as where the jacket is going to be shipped to, where the jacket is going to be shipped from, how much the jacket weighs, how large the package will be, as well as other useful information. The process then proceeds to a process block 504.

In the process block 504, the system 100 calculates the landed cost estimate. For example, the estimate could be calculated by the landed cost module 170 using the shipping information provided by the item reception center 240. The process then proceeds to a process block 505.

In the process block 505, the landed cost guarantee system calculates the landed cost guarantee fee associated with providing the landed cost guarantee. For example, the fee could be calculated by the landed cost module 170 based on the historical accuracy of calculating the landed cost estimate for sending an item to France. The process then proceeds to a process block 506.

In the process block 506, the package reception center 240 receives the landed cost estimate and the landed cost guarantee fee via the API 120. For example, the package reception center 240 could receive the landed cost estimate and the landed cost guarantee fee associated with shipping a jacket to a location in France. The process then proceeds to a decision block 507.

In the decision block 507, the item sender 210 is offered the opportunity to purchase the landed cost guarantee. For example, the item sender 210 of the jacket could choose to purchase a landed cost guarantee. If the item sender 210 does not purchase the landed cost guarantee, the process then proceeds to a process block 508. In the process block 508, the item is sent and the process then ends in a process block 509.

If the item sender 210 does purchase the landed cost guarantee, the process then proceeds to a process block 510.

In the process block 510, the landed cost guarantee estimate is collected from the item sender 210. For example, the landed cost estimate associated with shipping a jacket to a location in France could be collected from the item sender 210 by the item reception center 240. The amount collected can then be forwarded on to the item shipper using the transaction module 180. The process then proceeds to a process block 511.

In the process block 511, the landed cost guarantee fee is collected from the item sender 210. For example, the landed cost guarantee fee associated with shipping a jacket to France could be collected from the item sender 210 by the item reception center 240. The amount collected can then be forwarded on to the item shipper using the transaction module 180. The process then proceeds to a process block 512.

In the process block 512, the purchase of the landed cost guarantee is confirmed with the landed cost guarantee system. The confirmation can be accompanied by any information needed by the landed cost guarantee system to contact the item sender 210. This information could be item sender 210's address, email address, or telephone number. The process then proceeds to a process block 513.

In the process block 513, the landed cost guarantee system sends the landed cost guarantee reimbursement claim information to the item sender 210. As explained, this information on how to claim reimbursement could include the address of a website through which the item sender 210 could submit a reimbursement claim, a physical address of the place a person could send a reimbursement claim to, or any other information. The information could also include the types of documents that need to be submitted in order for a reimbursement claim to be successful. The process then proceeds to a process block 514.

In the process block 514, the landed cost guarantee system generates and communicates the item shipping label. For example, the landed cost guarantee system could generate a shipping label that shows that the package containing the jacket is being shipped to France and that the landed cost guarantee has been purchased for the package. The landed cost guarantee system could then send this shipping label to the item reception center via the API 120. The process then proceeds to a process block 515.

In the process block 515, the item reception center prints the shipping label and labels the item to be shipped with the shipping label. For example, the item reception center could print the shipping label generated for the package containing the item to be shipped to France and then label the package with the shipping label. The process then proceeds to a process block 516.

In the process block 516, the item is shipped. For example, the package containing the jacket could be shipped to France. The process then proceeds to a decision block 517.

From the decision block 517 onwards, the process 500 operates in a similar manner to how the process 400 operates in the decision block 417 through the process block 425. However, the e-tailer 230 is not present as an actor in process 500, so the e-tailer 230 is not one of the entities that can verify the actual landed cost in process block 522 or receive the reimbursement in process block 523.

Figure 6:
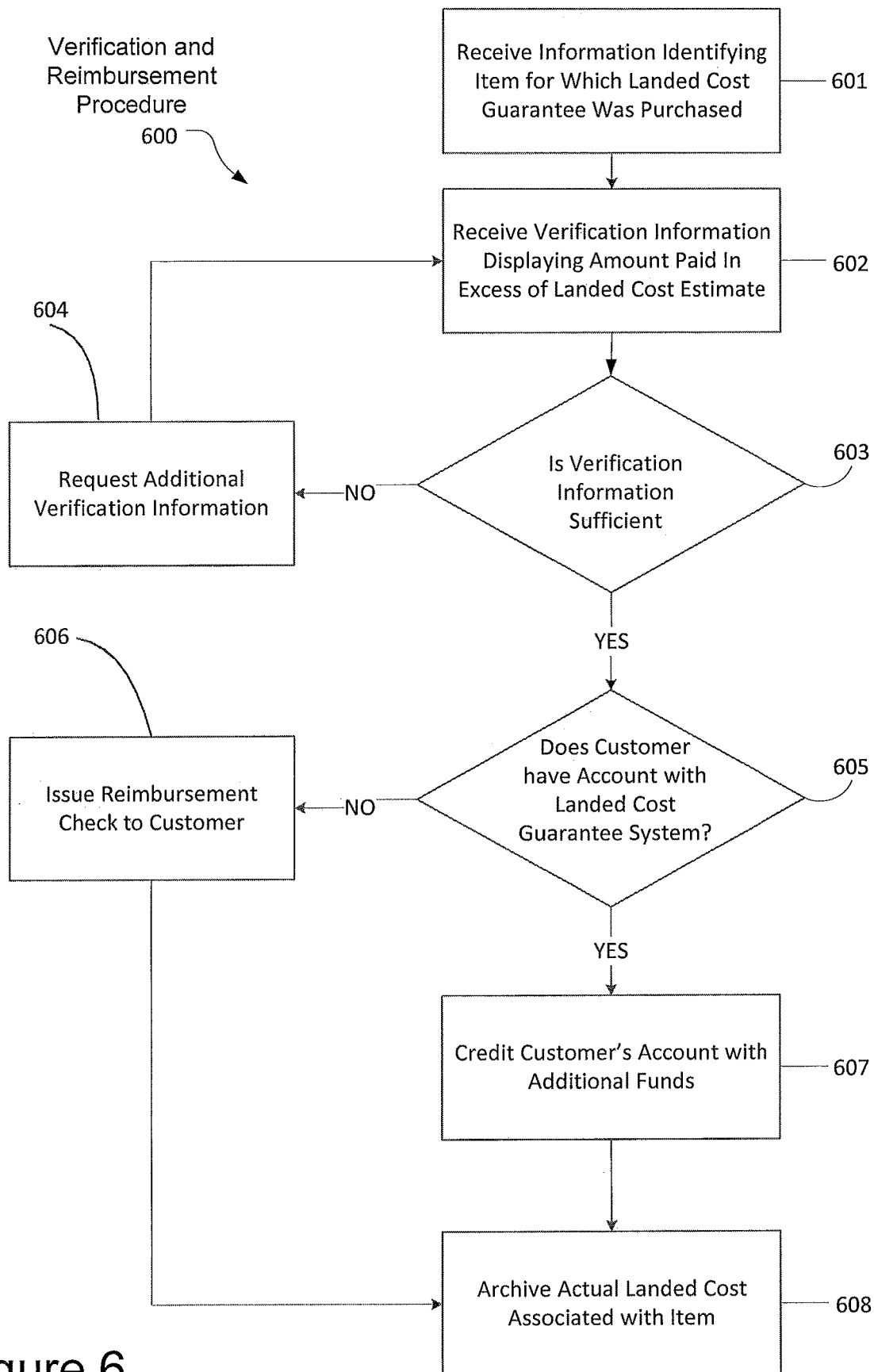
FIG. 6 is a flow chart depicting an embodiment illustrating how the landed cost guarantee system verifies actual landed cost and issue reimbursements.

FIG. 6 displays a process 600 for receiving verification information and issuing reimbursements in one embodiment of the present invention. The process 600 starts at a process block 601. In the process block 601, the landed cost guarantee system receives information identifying the item for which the landed cost guarantee was purchased. In some embodiments, the landed cost guarantee system can receive this information from the verification module 130. In some embodiments, the information that is received could be an alpha numeric code, such as a computer readable code stored in a database contained in the second memory 113 which identifies the item that the landed cost guarantee was purchased for, or any other identifying information. The process then proceeds to a process block 602.

In the process block 602, the landed cost guarantee system receives verification information that displays the actual landed cost and the amount paid in excess of the landed cost estimate. For example, the system could receive a digital receipt or other type of electronic record from a national post service displaying the actual landed cost. In some embodiments, the landed cost guarantee system could receive verification information from the item sender 210, the item receiver 220, a national post service, or any combination of these entities. Any other information that displays the actual landed cost could also be useful. The process then proceeds to a decision block 603.

In the decision block 603, the landed cost system determines if the verification information was sufficient to actually verify that the actual landed cost exceeded the landed cost guarantee estimate. For example, the system could determine if the information submitted was a receipt for the correct item by comparing the alpha-numeric code identifying the item with the shipping label generated by the system. The system could also determine if the verification information came from the correct national post office, or whether the verification information was a receipt at all. In some embodiments, the verification module 130 compares the verification information it received from the national post office to the verification information it received from the item sender 210 or the item receiver 220 to determine if the verification information is sufficient. If the verification information is insufficient, the process proceeds to a process block 604 where the process 600 requests additional verification information. From the process block 604, the process 600 returns to the process block 602.

If the verification information is sufficient, the system then proceeds to a decision block 605. In the decision block 605, the landed cost guarantee system determines if the entity submitting the verification information has an electronic account for reimbursement kept with the system. In some, embodiments, the system determines if the entity submitting the verification information designated a different entity to receive the reimbursement and then checks if the entity designated to receive reimbursement has an account with the system. If the entity does not have an account, the process then proceeds to a process block 606, where a reimbursement check is issued to the designated entity. If the entity has an account then the process proceeds to a process block 607, where funds are credited to the entity's account. Both the process block 606 and the process block 607 then proceed to a process block 608.

In the process block 608, the actual landed cost that was paid for shipping the item is archived with the system Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A system for processing a landed cost guarantee, the system comprising:
    a data store including a plurality of records, each record associated with a shipped item, wherein a record included in the plurality of records includes information identifying: the shipped item, a destination location for the shipped item, an estimated landed cost predicted prior to shipping the shipped item, a landed cost guarantee fee and an actual landed cost paid for the shipped item;
    an application programing interface (API) module configured to receive, via a processor, communications containing item shipping information for an item received at a first distribution entity;
    a landed cost module configured to:
        receive the item shipping information from the application programming interface module,
        retrieve a portion of the plurality of records from the data store based at least in part on the item shipping information, wherein the portion of the plurality of records include at least one value that is also included in the item shipping information;
        generate a metric indicating a level of prediction accuracy for the portion of the plurality of records by comparing the estimated landed cost with the actual landed cost paid for respective shipped items included in the portion of the plurality of records;

generate a landed cost estimate based at least in part on the item shipping information;
generate a landed cost guarantee fee based at least in part on the item shipping information and the metric; and
store a record in the data store for the item, wherein the record includes the item shipping information, the landed cost guarantee fee and the landed cost estimate;
a transaction module in communication with the landed cost module, the transaction module configured to:
receive payment of the landed cost estimate amount based on the generated landed cost estimate; and
receive payment of the landed cost guarantee fee amount based on the generated landed cost guarantee fee;
a shipping label module in communication with the landed cost module, the shipping label module configured to:
generate a computer readable code which encodes information relating to the item shipping information and the landed cost guarantee fee; and
generate a label having the computer readable code thereon, wherein the code is at least indicative of whether or not the landed cost guarantee fee was paid;
a verification module configured to:
automatically receive, from the transaction module, an amount of an actual landed cost paid for the item, and an indication of a payment of a difference between the actual landed cost paid for the item and the landed cost estimate when a second distribution entity decodes the code and determines that the landed cost guarantee fee was paid, and
update the record for the item to include the actual landed cost paid; and
wherein the second distribution entity automatically receives payment when the actual landed cost is greater than the landed cost estimate, wherein the payment includes an amount equal to the difference between the actual landed cost paid and the landed cost estimate.

2. The system according to claim 1, further comprising a transaction module configured to:
receive, from the application programing interface module, payment information for the item, wherein the payment information includes an amount corresponding to the landed cost guarantee fee and the landed cost estimate; and
store, in the data store, information indicating receipt of the landed cost guarantee fee.

3. The system according to claim 1, wherein the landed cost module generates landing cost guarantee fees which are inversely proportional to a corresponding level of prediction accuracy.

4. The system according to claim 1, wherein the computer readable code encodes information related to the landed cost guarantee fee including the amount of the landed cost estimate.

5. The system according to claim 1, wherein the system further comprises a communication module configured to send, via a processor, communications on how to submit verification information and receive reimbursements.

6. The system according to claim 1, wherein the application programming interface module is further configured to receive communications confirming purchase of the landed cost guarantee.

7. The system according to claim 1, additionally comprising:
a reimbursement module configured to:
receive, from a user device of a sender of the item, via the application programming interface, a request for reimbursement for the item, wherein the request includes information identifying the item;
determine that the landed cost guarantee fee has been received for the item;
determine that the verification module has received the indication of payment of the actual landed cost from the first distribution entity; and
after determining that the landed cost guarantee fee has been received and that the verification module has received the indication of payment, generate reimbursement for the difference between the actual landed cost and the landed cost estimate.

8. The system according to claim 1, wherein the first distribution entity comprises a domestic distribution entity and the second distribution entity comprises a foreign distribution entity, and wherein when the actual landed cost is greater than the landed cost estimate, the domestic distribution entity is automatically charged or debited for the difference between the actual landed cost and the landed cost estimate upon decoding of the code by the foreign destination entity.

9. The system according to claim 1, wherein the first distribution entity comprises a domestic distribution entity and the second distribution entity comprises a foreign distribution entity, and wherein the code is further indicative of a party to be charged or debited when the actual landed cost is greater than the landed cost estimate, and to automatically charge or debit the party for the difference between the actual landed cost and the landed cost estimate upon decoding of the code by the foreign destination entity.

10. The system according to claim 8, wherein the domestic distribution entity automatically receives the landed cost guarantee fee when the actual landed cost is less than or equal to the landed cost estimate.

11. The system according to claim 1, wherein the first distribution entity comprises a domestic distribution entity and the second distribution entity comprises a foreign distribution entity, and wherein the domestic distribution entity automatically receives the amount of the landed cost estimate upon decoding of the code by the foreign destination entity.

12. The system according to claim 1, wherein a party that pays the landed cost estimate and the landed cost guarantee fee receives an amount of the difference between the actual landed cost and the landed cost estimate when a reimbursement request is made and when the actual landed cost is less than the landed cost estimate.

13. A computer-implemented method for processing a landed cost guarantee, the method comprising:
under control of one or more processors,
storing, in a memory device, a plurality of records, each record associated with a shipped item, wherein a record included in the plurality of records includes information identifying: the shipped item, a destination location for the shipped item, a landed cost guarantee fee, an estimated landed cost predicted prior to shipping the shipped item, and an actual landed cost paid for the shipped item;
establishing communications with a first distribution entity and a second distribution entity;

receiving at the first distribution entity, via a computing device and a network, shipping information for shipping an item;

retrieving a portion of the plurality of records from the memory device based at least in part on the item shipping information, wherein the portion of the plurality of records include at least one value that is also included in the item shipping information;

generating a metric indicating a level of prediction accuracy for the portion of the plurality of records by comparing the estimated landed cost with the actual landed cost paid for respective shipped items included in the portion of the plurality of records;

generating a landed cost estimate based at least in part on the item shipping information;

generating a landed cost guarantee fee based at least in part on the item shipping information and the metric;

storing, in the memory device, a record for the item, wherein the record includes the item shipping information, the landed cost guarantee fee and the landed cost estimate;

receiving at the first distribution entity payment of the landed cost estimate amount based on the generated landed cost estimate;

receiving at the first distribution entity payment of the landed cost guarantee fee amount based on the generated landed cost guarantee fee;

generating a computer readable code which encodes information relating to the item shipping information and the landed cost guarantee fee;

generating a shipping label having the computer readable code thereon, wherein the code is at least indicative of whether or not the landed cost guarantee fee was paid;

decoding the code by the second distribution entity to determine whether the landed cost guarantee fee was paid;

receiving from the second distribution entity an indication that an actual landed cost is greater than the landed cost estimate upon the decoding of the code by the second distribution entity and determining that the landed cost guarantee fee was paid;

updating the record for the item to include the actual landed cost amount; and automatically distributing payment from the first distribution entity to the second distribution entity when the actual landed cost as provided by the second distribution entity is greater than the landed cost estimate, wherein the payment includes an amount equal to the difference between the actual landed cost paid and the landed cost estimate.

14. The computer-implemented method according to claim 13, further comprising:

receiving payment information for the item, wherein the payment information includes an amount corresponding to the landed cost guarantee fee and the landed cost estimate; and storing, in the memory device, information indicating receipt of the landed cost guarantee fee.

15. The computer-implemented method according to claim 13 wherein the code on the shipping labels designate whether the landed cost guarantee was purchased for items and the amount of the landed cost estimate.

16. The computer-implemented method according to claim 13, wherein the method further comprises communicating, via a computing device, how to submit verification information.

17. The computer-implemented method according to claim 13, wherein the method further comprises communicating, via a computing device, how to receive reimbursements.

18. The computer-implemented method according to claim 13, wherein the method further comprises receiving, via a computing device, communications confirming purchase of the landed cost guarantee.

19. The computer-implemented method according to claim 13, additionally comprising:

receiving, from a user device of a sender of the item, a request for reimbursement for the item, wherein the request includes information identifying the item;

determining that the landed cost guarantee fee has been received for the item;

determining that the actual landed cost amount was received from the first distribution entity; and after determining that the landed cost guarantee fee has been received and that the actual landed cost amount has been received, reimbursing, via a computing device, the difference between the actual landed cost and the landed cost estimate.

20. The computer-implemented method according to claim 13, wherein the first distribution entity comprises a domestic distribution entity and the second distribution entity comprises a foreign distribution entity, and wherein when the actual landed cost is greater than the landed cost estimate, the domestic distribution entity is automatically charged or debited for the difference between the actual landed cost and the landed cost estimate upon decoding of the code by the foreign destination entity.

21. The computer-implemented method according to claim 13, wherein the first distribution entity comprises a domestic distribution entity and the second distribution entity comprises a foreign distribution entity, and wherein the code is further indicative of a party to be charged or debited when the actual landed cost is greater than the landed cost estimate, and automatically charging or debiting the party upon decoding of the code by the foreign destination entity.

22. The computer-implemented method according to claim 13, wherein the sender of the item receives an amount of the difference between the actual landed cost and the landed cost estimate when a reimbursement request is made and when the actual landed cost is less than the landed cost estimate and the landed cost guarantee fee was paid.

23. A system for processing a landed cost guarantee, the system comprising:

a non-transitory computer-readable storage medium including processor executable instructions; and at least one processor configured to execute the processor executable instructions to cause the system to at least:

store, in a memory device, a plurality of records, each record associated with a shipped item, wherein a record included in the plurality of records includes information identifying: the shipped item, a destination location for the shipped item, a landed cost guarantee fee, an estimated landed cost predicted prior to shipping the shipped item, and an actual landed cost paid for the shipped item;

establish communications with a first distribution entity and a second distribution entity;

receive, at the first distribution entity, shipping information for shipping an item;

retrieve a portion of the plurality of records from the memory device based at least in part on the item shipping information, wherein the portion of the plurality of records include at least one value that is also included in the item shipping information;

generate a metric indicating a level of prediction accuracy for the portion of the plurality of records by comparing the estimated landed cost with the actual landed cost paid for respective shipped items included in the portion of the plurality of records;

generate a landed cost estimate based at least in part on the item shipping information;

generate a landed cost guarantee fee based at least in part on the item shipping information and the metric;

store, in the memory device, a record for the item, wherein the record includes the item shipping information, the landed cost guarantee fee and the landed cost estimate;

receive, at the first distribution entity, payment of the landed cost estimate amount based on the generated landed cost estimate;

receive, at the first distribution entity, payment of the landed cost guarantee fee amount based on the generated landed cost guarantee fee;

generate a computer readable code which encodes information relating to the item shipping information and the landed cost guarantee fee;

generate a shipping label having a computer readable code thereon, wherein the code is at least indicative of whether or not the landed cost guarantee fee was paid;

decode the code by the second distribution entity to determine whether the landed cost guarantee fee was paid;

upon the second distribution entity decoding the code and determining that the landed cost guarantee fee was paid, automatically receive, from the second distribution entity, an actual landed cost amount and a difference between the actual landed cost paid for the item and the landed cost estimate; and automatically distribute payment to the second distribution entity when the actual landed cost as provided by the second distribution entity is greater than the landed cost estimate, wherein the payment includes an amount equal to the difference between the actual landed cost paid and the landed cost estimate.

24. The system according to claim 23, wherein the at least one processor configured to execute the processor executable instructions further causes the system to at least:

receive, from a user device of a sender of the item, a request for reimbursement for the item, wherein the request includes information identifying the item;

determine that the landed cost guarantee fee has been received for the item;

determine that the actual landed cost amount has been received from the first distribution entity; and after determining that the landed cost guarantee fee has been received and that the actual landed cost amount has been received, reimburse, via a computing device, the difference between the actual landed cost and the landed cost estimate.

* * * * *